United States Patent [19]
Rioux et al.

[11] Patent Number: 5,607,026
[45] Date of Patent: Mar. 4, 1997

[54] SNOWMOBILE TRANSMISSION JACKSHAFT

[75] Inventors: Roger Rioux; Gilles Pesant, both of Magog, Canada; Willy Bostelmann, Gunskirchen, Austria; Jean-Guy Talbot, Valcourt, Canada; Berthold Fecteau; Raymond Cote, both of Richmond, Canada; Yvon Gagne, Valcourt, Canada

[73] Assignee: Bombardier Inc., Canada

[21] Appl. No.: 426,918

[22] Filed: Apr. 21, 1995

[51] Int. Cl.⁶ .................................................. B62M 27/02
[52] U.S. Cl. ............................................ 180/190; 180/376
[58] Field of Search ................................. 180/182, 186, 180/190, 191, 193, 376

[56] References Cited

U.S. PATENT DOCUMENTS

| | | | |
|---|---|---|---|
| 3,963,083 | 6/1976 | Reese | 180/190 |
| 3,985,192 | 10/1976 | Samuelson et al. | 180/190 |
| 4,069,882 | 1/1978 | Leonard et al. | 180/190 |
| 4,362,524 | 12/1982 | Lob et al. | 180/190 X |
| 5,152,255 | 10/1992 | Fukuda | 180/190 X |

FOREIGN PATENT DOCUMENTS 953537  8/1974  Canada.

*Primary Examiner*—Kevin Hurley
*Attorney, Agent, or Firm*—Larson and Taylor

[57] ABSTRACT

In a snowmobile drive train the variable ratio belt drive is not directly coupled to the engine crankshaft as in the prior art, but rather the driving pulley of the variable ratio belt drive is carried on one end of a jackshaft and the engine power is applied to the opposite end of the jackshaft. The jackshaft is supported in a fixed bearing in the vehicle frame, this bearing being immediately adjacent to the driving pulley so that the influence on the belt drive of vibrations generated by the engine is vastly diminished. Therefore the engine mounts can be arranged to fully absorb vibrations of the engine. Previously, when the driving pulley was directly coupled to the engine crankshaft it was necessary to include a tie restraint to limit movements of the engine housing in the direction of separation between the axes of the driving and driven pulleys.

11 Claims, 3 Drawing Sheets

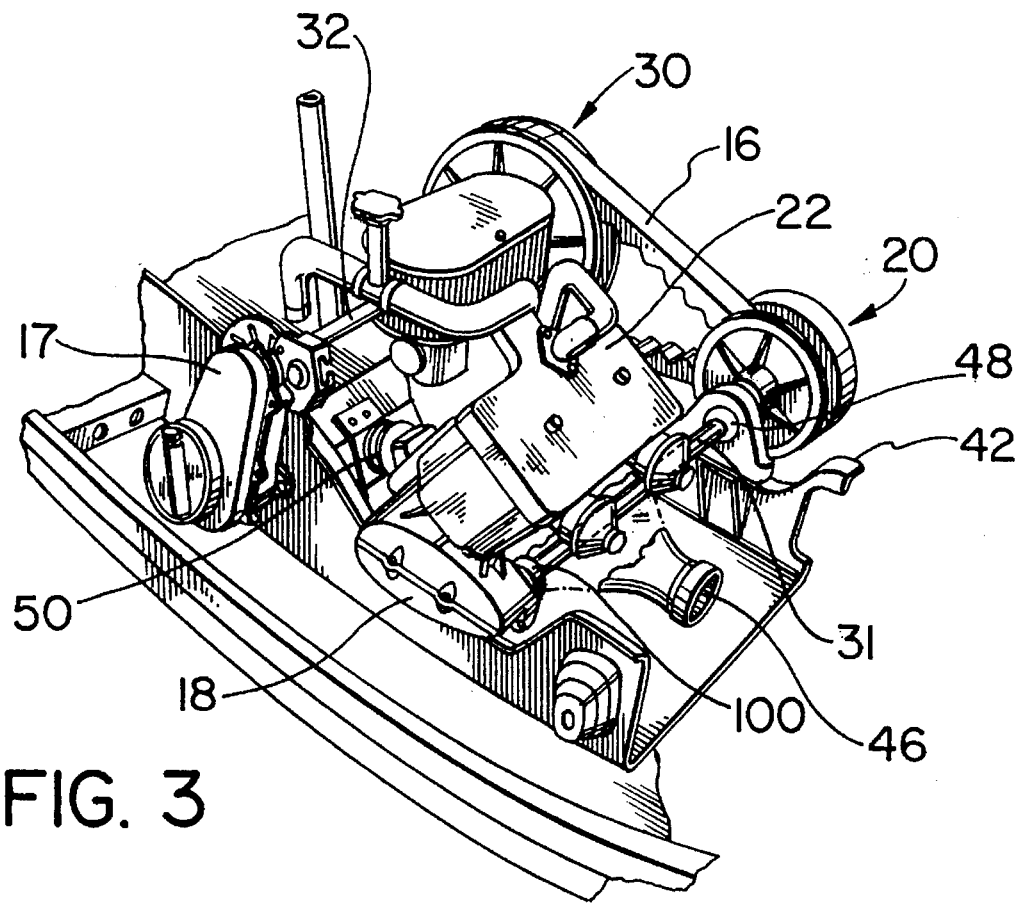

SNOWMOBILE TRANSMISSION JACKSHAFT

BACKGROUND OF THE INVENTION

1. Field of the Invention

This invention relates to an improved snowmobile drive clutch mounting arrangement and to a snowmobile incorporating such an arrangement.

2. Description of the Prior Art

Conventional snowmobile drive trains incorporate a variable ratio belt drive system having a driving pulley that is directly coupled to the engine crankshaft. The driving pulley acts as a clutch and includes a centrifugally actuated adjusting means through which the drive ratio of the belt drive is varied progressively as a function of the engine speed and the output torque of the driven pulley. Typically, the driven pulley is coupled to a shaft which in turn drives the input member of a chain and sprocket reduction drive the output of which is coupled to one end of the axle of the track-driving sprocket wheels.

This arrangement suffers a number of drawbacks the most significant of which is that the driving pulley is directly exposed to vibrations and movements of the engine, which proves to be detrimental to its efficient operation. Indeed, the efficiency of the belt drive system is adversely affected by any variation in the relative position and/or alignment of the pulleys. A summation of the internal forces present in the belt during operation shows a resulting force vector that tends to pull both pulleys together. The engine being mounted on flexible rubber supports, a displacement of the engine occurs under load which results in a variation of the center-to-center distance of the pulleys together with significant misalignment.

Furthermore, during operation, important reaction forces, resulting from the inertia of the crankshaft and related internal masses being accelerated and decelerated, are generated in the engine housing. These forces result in a displacement of the engine around its supports which further affects the efficiency of the belt drive system.

Typically, a tie-rod is used to restrain longitudinal displacement of the engine housing around its mounts and minimize the consequences on the belt drive operation. However, while to some extent this helps the belt drive situation, it is done at the expense of an increased level of vibrations transmitted to the rider through the frame structure as well as a higher stress level imposed on related structural components which necessitates stronger and heavier construction. To perform satisfactorily, this prior art arrangement necessitates beforehand precise and careful alignment of the engine in the snowmobile frame as well as the correct adjustment of the tie-rod device, which contribute to an increase in the complexity of the assembly operations on the production line.

SUMMARY OF THE INVENTION

The present invention provides a snowmobile comprising: a frame having a forward end supported on steerable ski means and a rearward end supported on an endless drive track; an engine mounted in said frame and connected via a drive train to deliver propulsion power to said drive track; said drive train including a transversely arranged jackshaft that is operatively connected at one end to be driven from said engine and that is coupled at the opposite end to drive a variable ratio belt drive transmission, the latter comprising a drive belt looped around a driving pulley and a driven pulley, and a speed responsive mechanism operatively connected to said driving pulley and adapted to effect a progressive variation in the drive ratio of said transmission as the speed of rotation of the driving pulley and the output torque of the driven pulley are altered; wherein said jackshaft is rotatably supported in a bearing carried by said frame and said driving pulley is fixed to rotate with said jackshaft.

The driving pulley is coupled to the engine unit via the jackshaft which is of substantial length and is supported close to the driving pulley by the bearing mounted on the snowmobile frame. The bearing is advantageously located as close as possible to the belt centerline in order to minimize the effects of engine housing vibrations on said belt drive transmission, and to minimize also the belt reaction force on the jackshaft bearing as well as the bending loads in the said jackshaft. Preferably, the design of the bearing and/or bearing/housing assembly is such that it can accommodate a certain amount of misalignment of the jackshaft with respect to the frame structure. This can be an inherent feature of the bearing or bearing/housing unit, or more simply it can result from a certain degree of flexibility of the frame structure in the area of the bearing mounting.

The opposite end of the jackshaft is coupled to the engine unit by means of a coupling which is designed to accommodate some misalignments. Preferably, the latter coupling is also designed so as to compensate for any lateral displacement of the engine unit during operation, and so as to act also as a rotational vibration damper.

In this way, displacements of the engine unit around its mounts are still transmitted to the drive pulley which results in some misalignment, but this angle is far less important than was the case with the prior art arrangement. Moreover, since the supporting bearing of the jackshaft is fixed on the frame structure, these engine unit displacements do not produce a significant variation in the center-to-center distance between the axes of the driving and driven pulleys. A minor variation in this distance may still occur through the levering effect arising from the resulting jackshaft misalignment angle and the distance along the shaft from the bearing to the belt centerline. As compared with the prior art arrangement, these variations are dramatically reduced and are furthermore diminished as the jackshaft length between the bearing and the input coupling is increased.

On the other hand, the tension forces present in the belt during operation generate a reaction which is transmitted to the engine unit housing through the jackshaft coupling. This reaction force is reduced compared to the belt tension force in the same proportion as the ratio of the length of the shaft from the coupling to the bearing versus that between the bearing and the belt centerline. By contrast, in the prior art arrangement, the tension force of the belt is applied undiminished to the engine housing since the driving pulley is mounted directly on the crankshaft or on a secondary shaft mounted on the engine housing. Besides, to make things worse, this force is applied in a cantilever fashion with respect to the flexible engine supports, a situation which is minimized in the arrangement in accordance with the present invention.

In this way, the reaction to the tension forces in the belt transmitted to the engine housing is not only reduced in size as compared to the prior art arrangement, but is also applied and distributed more evenly between the different engine mounts which, consequently, helps to reduce the magnitude of the resultant engine displacement and allows the use of more efficient engine mounts.

The most important benefit of the new arrangement discussed above is the improvement in performance and efficiency of the belt drive transmission system. However, other advantages and possibilities also arise from the improved configuration.

Since the movements of the engine unit in space are no longer detrimental to the correct operation of the belt drive, it is now possible to use softer engine mounts to obtain a better isolation for both rider and frame from engine vibrations. Likewise, it is also no longer necessary to use any tie-restraint device to immobilize the engine unit in the longitudinal axis (which prior art practice to some extent negated the advantages of the use of flexible engine mounts).

The result is an improvement in rider comfort as well as the possibility of reducing somewhat the weight of the snowmobile frame and some related structural components.

Furthermore, these features lead to another possibility: for those same reasons, in production it is now possible, without jeopardizing the correct operation of the belt drive system, to eliminate the steps hitherto required to ensure precise alignment of the engine unit in the snowmobile. In this way, some components can be eliminated, and the assembly process is accelerated and simplified. Moreover, it helps to improve the quality and reliability of the final product since it eliminates a possible troublesome source of performance degradation which could arise if scheduled maintenance is not performed properly and regularly.

BRIEF DESCRIPTION OF THE DRAWINGS

The invention will further be described, by way of example only, with reference to the accompanying drawings wherein:

FIG. 3 is a partial front perspective view of the snowmobile engine and the drive train corresponding to that of FIG. 2B;

FIG. 4 is a somewhat schematic view showing the configuration of the drive train of FIG. 2B.

DESCRIPTION OF THE PREFERRED EMBODIMENTS

A snowmobile 10 is supported at its forward end on a pair of steerable skis 12 and at its rearward end, on an endless drive track 14, which is passed in a loop over the drive and suspension elements. The snowmobile engine delivers power to the drive track through a drive train under the control of the driver or operator.

Figure 1:
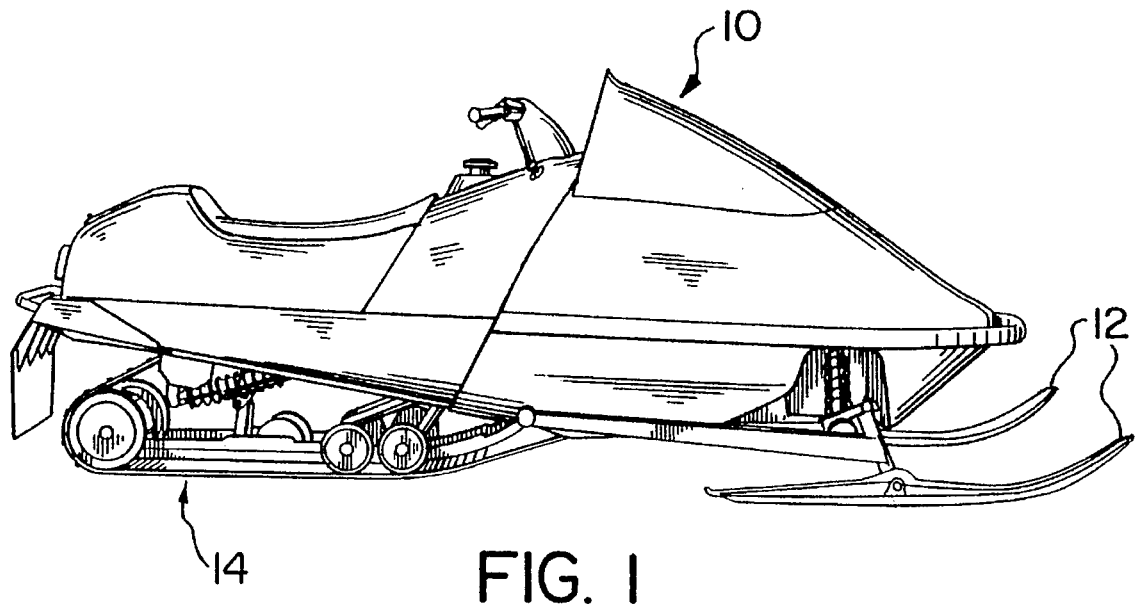
FIG. 1 is a perspective side view of a snowmobile incorporating a drive train in accordance with the invention.
Figure 2A:
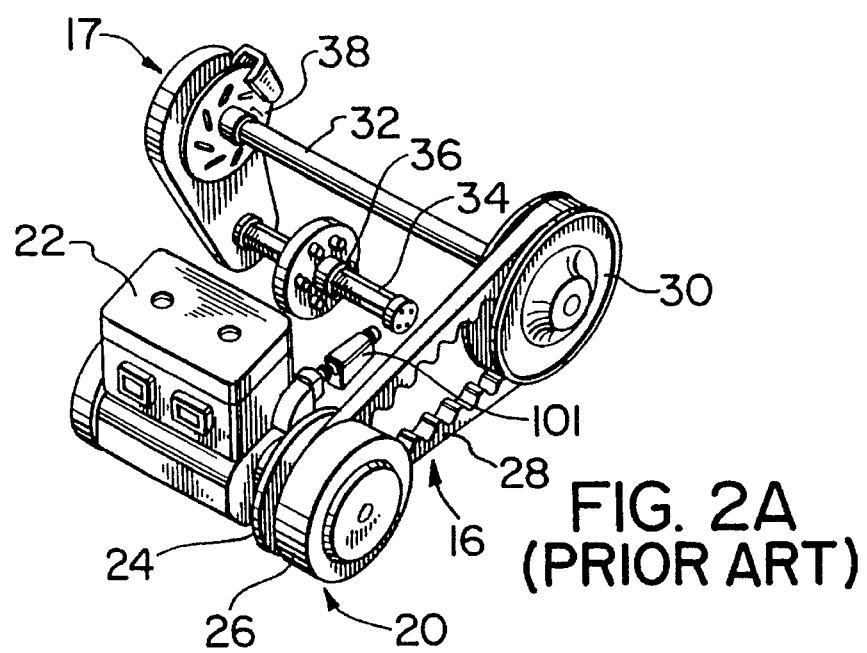
FIG. 2A is a schematic perspective view illustrating a drive train of the prior art.

FIG. 2A illustrates a typical prior art drive train incorporating a variable ratio belt drive system 16 and a fixed ratio reduction drive 17. The driving pulley 20 of the belt drive system 16 is coupled to rotate with the crankshaft of the engine 22 and incorporates a pair of opposed frustoconical belt drive flanges 24 and 26 between which the drive belt 28 is located. In known manner the flanges 24 and 26 are biassed apart, and the driving pulley 20 incorporates a centrifugally operated means that acts to urge the moving flange 26 towards the fixed flange 24 with a force that increases with increasing crankshaft speed so that as the engine speed increases the reduction ratio of the belt drive 16 system decreases. The driven pulley 30 reacts to the output torque by its flanges separation (not shown) which allows the belt to engage the driven pulley 30 at a diameter that reduces progressively as the engagement diameter between the belt 28 and the driving pulley 20 increases. The arrangement of such a variable ratio belt drive need not be described in any detail, since it is well understood in the art.

The engine 22 is mounted transversely in the snowmobile, and parallel to its crankshaft there is a transverse shaft 32 supported in bearings in the snowmobile frame (not shown) to rotate on an axis parallel to the engine crankshaft, the driven pulley being keyed to rotate with the transverse shaft. The opposite end of the transverse shaft 32 is couple to the input of the reduction drive 17, the output of which is coupled to the drive axle 34 which is mounted to rotate in the snowmobile frame and carries sprocket wheels 36 that form a driving connection with the track 14. A braking system for the snowmobile incorporates a brake disc 38 fixed to rotate with the transverse shaft 32.

From a consideration of the schematic layout shown in FIG. 2A it will be appreciated that the driving pulley 20 rotates at the same speed as the crankshaft of the engine whereas the speed rotation of the transverse shaft 32 will vary in accordance with the instantaneous ratio of the belt drive system, and the drive axle 34 will rotate at a lower speed than the transverse shaft 32 because of the action of the reduction drive 17. Typically, the reduction drive 17 comprises a small sprocket on the transverse shaft 32 coupled to drive a larger sprocket on the axle 34 through a driving chain, all enclosed within a housing 17A and are not shown since they are well known elements.

The driving pulley 20, being coupled directly to the crankshaft of the engine 22, is subjected to rather severe vibrations as normally occur in small engines, and as a result may have a tendency to excessive wear and noise. Also, to maintain the efficiency of the drive belt system 16, it is necessary to ensure that the center to center spacing between the driving pulley 20 and the driven pulley 30 remains constant, and that the alignment of these pulleys does not vary significantly. This in turn imposes restrictions on the amount of damping that can be incorporated in the vibration absorbing mountings (not shown) connecting the engine 22 to the snowmobile frame, and typically with this drive train there is a longitudinally extending tie rod 101 connecting the engine to the snowmobile frame, to prevent variations in the center-to-center distance between the pulleys 20 and 30. This however means that engine vibrations in this direction are not damped, but rather are transmitted through the tie rod 101 to the snowmobile frame.

Figure 2B:
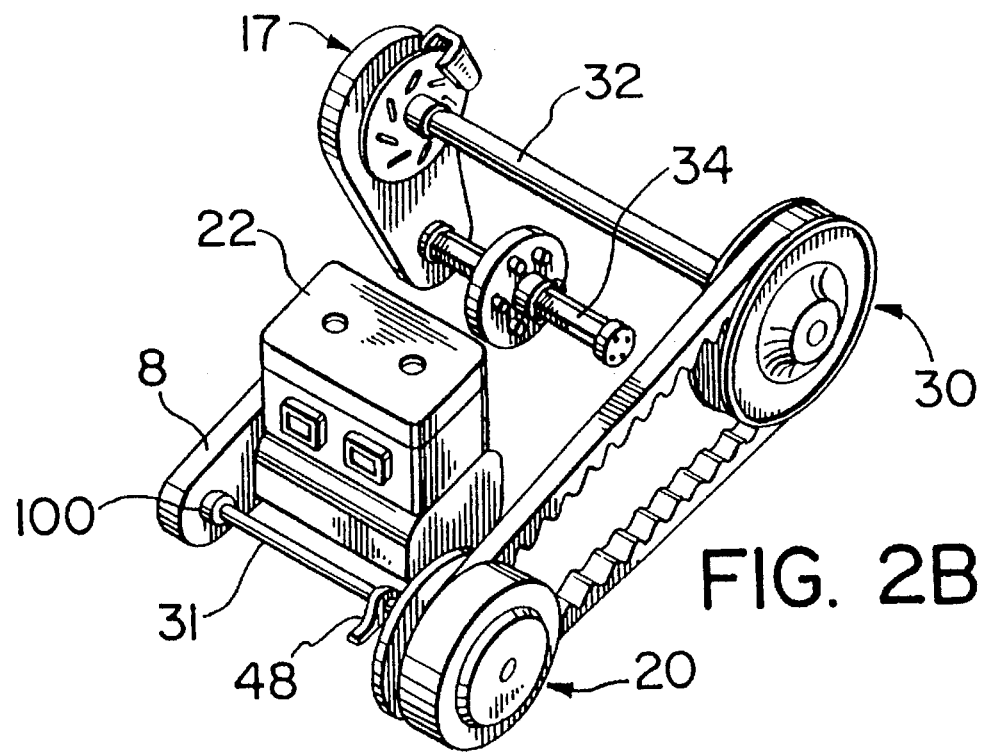
FIG. 2B is a view corresponding to FIG. 2A but showing a drive train in accordance with the present invention.

In the drive train according to the invention as shown in FIG. 2B, the engine incorporation an output drive (not shown) in a housing 8 that includes short transfer shaft (not shown) connected by a coupling 100 to rotate a jackshaft 31 that extends transversely close to the front side of the engine and that is mounted to rotate in suitable bearing 48 in the snowmobile frame. As seen in FIG. 3 the jackshaft 31 extends transversely on the front side of the engine beneath the exhaust manifold 46 and passes through the bearing 48 which is mounted on the left side frame member 42. The bearing 48 supports the jackshaft 31 at a fixed location in the frame but is of a type that can accommodate minor (e.g. up to a few degrees) angular misalignments of the jackshaft. On the outboard side of the frame member 42 the jackshaft 31 supports the driving pulley 20 while the opposite end of the jackshaft 31 is driven by the engine 22 by means of the coupling 100 that can accommodate minor (e.g. up to a few degrees) angular misalignment. In the case of this particular realisation, the coupling 100 is of a type which can compensate for minor lateral displacement of the engine 22 with respect to the frame side member 42. Moreover, this particular coupling 100 further isolates the belt drive system 16 from the effect of engine vibrations since it is designed to dampen the torsional vibrations as well.

The engine 22 is carried in vibration dampening mountings 50 that are mounted on the snowmobile frame; specifically the first two mounts 50 being located at the rear of the engine on the frame apron while a second pair of mounts is located in front of the engine on a structural frame cross member (not shown).

With the arrangement as described above, it will be appreciated that the driving pulley 20 is positioned relatively close to the bearing 48 that supports the jackshaft 31 on the side frame member 42, and is thus effectively isolated from the effects of engine housing vibrations. Specifically engine housing vibrations can reach the driving pulley 20 essentially only through the jackshaft 31, and therefore the amplitude of any such vibration would be diminished in direct proportion to the ratio of the distance from the bearing 48 to the belt centerline and the distance from the bearing 48 to the coupling 100. Typically this ratio, which corresponds to the ratio of the distance A and B shown in FIG. 4, is of the order of 1:7 to 1:3 so that the vibrations reaching the driving pulley 20 are very much diminished. Thus, design of the vibration absorbing engine mounts 50 can be predicated solely on the desired objective of reducing vibrations applied to the snowmobile frame. It is no longer necessary to employ the prior art tie rod (101 FIG. 24) to limit movement and vibrations of the engine in the direction of the center-to-center spacing of the driving and driven pulleys of the belt drive system, since the latter is now sufficiently isolated from the engine that this spacing is not significantly changed by the engine movements.

The net effect of the various modifications and novel arrangements discussed above and/or shown in the drawings is to provide a vehicle that has a more efficient drive train resulting in a vehicle that has improved performance and that is more comfortable for the operator because of the lower vibration level.

In the arrangement shown schematically in FIG. 2B, the position of the transverse shaft 32 is essentially unchanged, and the reduction drive 17 between this shaft and the axle 34 is still required since the output coupling 100 from the engine rotates at a speed which is the same or close to the speed of rotation of the crankshaft of the engine 22.

Figure 2C:
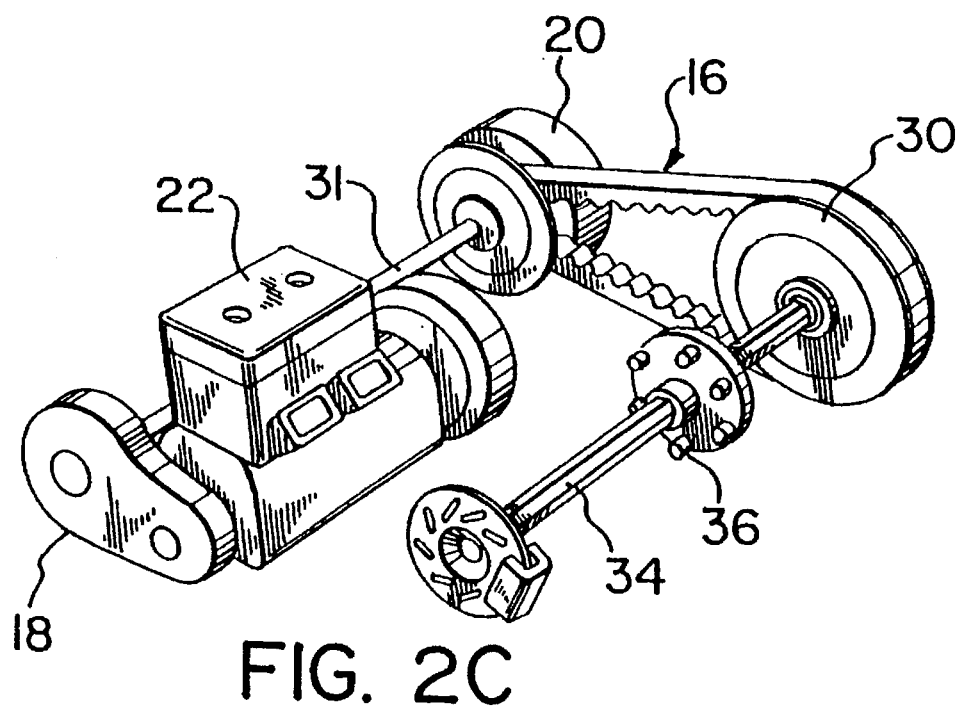
FIG. 2C is a schematic perspective view showing a preferred embodiment of the drive train.

FIG. 2C shows an arrangement of a snowmobile drive train which in addition to the jackshaft 31 as described above in relation to FIG. 2B and FIG. 4 also includes a reduction drive 18 between the engine crankshaft and the jackshaft 31. This arrangement provides all of the advantages discussed above in relation to the embodiment of FIG. 2B as well as a number of further advantages. In particular, by providing the reduction drive 18 directly at the engine output, the reduction drive 17 between the transverse shaft 32 and the sprocket drive 34 can be dispensed with. With this arrangement there are also significant benefits to be gained in the performance of the snowmobile drive train and in particular of the belt drive system 16.

What we claim is:

1. A snowmobile comprising:
   a frame having a forward end supported on steerable ski means and a rearward end supported on an endless drive track;
   a drive train;
   an engine mounted in said frame and connected to said drive track via said drive train for delivering propulsion power to said drive track, said engine being connected to said frame through vibration absorbing mountings for reducing the transmission of engine vibration effects to said frame,
   said drive train including a transversely arranged jackshaft operatively connected at one end to said engine and coupled at the opposite end to a variable ratio belt drive transmission comprising a drive belt looped around a driving pulley and a driven pulley, and a speed responsive mechanism operatively connected to said driving pulley and adapted to effect a progressive variation in the drive ratio of said transmission as the speed of rotation of the driving pulley and the output torque of the driven pulley are altered; and
   a bearing carried by said frame for rotatably supporting said jackshaft, said driving pulley being fixed to rotate with said jackshaft.

2. A snowmobile as claimed in claim 1 wherein said driving pulley is located adjacent to said bearing, and said one end of the jackshaft is remote from said bearing.

3. A snowmobile as claimed in claim 2 wherein said bearing is constructed and arranged to accommodate minor variations in the alignment of said jackshaft.

4. A snowmobile as claimed in claim 2 wherein said one end of the jackshaft is connected to a vibration absorbing coupling through which power is transmitted from said engine.

5. A snowmobile as claimed in claim 1 wherein said bearing is located in close proximity to said driving pulley such that effects of engine generated vibrations transmitted through said jackshaft to said driving pulley are diminished in proportion to the ratio of the distance between said bearing and said drive belt centerline, and the distance between said bearing and said one end of said jackshaft.

6. A snowmobile as claimed in claim 5 wherein said frame comprises a track tunnel having a generally inverted U-shaped channel outline, and a pair of spaced generally vertical side frame members positioned forward of said track tunnel, said engine mountings being positioned at least partly in said side frame members.

7. A snowmobile as claimed in claim 5 wherein said drive train includes an output shaft connected to be driven by said engine, said output shaft being coaxial to said jackshaft and coupled thereto through a vibration absorbing coupling.

8. A snowmobile as claimed in claim 6 wherein said jackshaft extends to the outboard side of one of said side frame members where it is directly coupled to said driving pulley.

9. A snowmobile as claimed in claim 1 wherein said jackshaft is operatively connected to be driven from said engine through a speed reduction mechanism carried by said engine.

10. A snowmobile as claimed in claim 9 wherein said engine is mounted transversely so that the crankshaft thereof extends generally parallel to said jackshaft, said speed reduction mechanism comprising a fixed ratio chain or gear drive.

11. A snowmobile as claimed in claim 10 wherein said speed reduction mechanism is enclosed in a housing rigidly affixed to one end of said engine and having an output member coupled to said jackshaft, said bearing being located beyond the opposite end of the engine.

* * * * *